United States Patent [19]

Logsdon

[11] Patent Number: 4,611,626
[45] Date of Patent: Sep. 16, 1986

[54] FLUID CONTROL VALVE

[76] Inventor: Duane D. Logsdon, 1708 Calavera Dr., Fullerton, Calif. 92631

[21] Appl. No.: 649,831

[22] Filed: Sep. 11, 1984

[51] Int. Cl.⁴ ............................................. F16K 11/20
[52] U.S. Cl. ...................................... 137/594; 4/192; 137/595; 251/309; 251/317
[58] Field of Search ............... 137/594, 595, 606, 607, 137/801, 637, 637.1; 251/309, 314, 316, 317; 222/556; 4/192, 194, 195

[56] References Cited

U.S. PATENT DOCUMENTS

| | | | |
|---|---|---|---|
| 746,896 | 12/1903 | Stott | 137/637.1 |
| 783,313 | 2/1905 | Roberts | 137/606 |
| 839,172 | 12/1906 | Miller | 137/594 X |
| 1,258,262 | 3/1918 | Shapley | 137/606 X |
| 2,047,615 | 7/1936 | Chadborn | 137/595 X |
| 2,075,740 | 3/1937 | McKay | 137/637 |
| 2,263,794 | 11/1941 | Wyen | 251/309 X |
| 2,427,124 | 9/1947 | Dawson | 137/606 |
| 3,118,650 | 1/1964 | Cooper et al. | 251/317 X |
| 3,133,723 | 5/1964 | Goldman et al. | 251/309 |
| 3,234,958 | 2/1966 | Butters | 251/316 X |
| 3,393,844 | 7/1968 | Beres et al. | 251/317 X |
| 3,903,926 | 9/1975 | Kempler | 137/637 |

*Primary Examiner*—Martin P. Schwadron
*Assistant Examiner*—Stephen M. Hepperle
*Attorney, Agent, or Firm*—K. H. Boswell; Edward D. O'Brian

[57] ABSTRACT

A fluid control valve capable of controlling both a hot and cold water supply for an appliance such as a washing machine or the like includes a handle which can be used to simultaneously turn on and turn off both the hot and cold water supply, or allows for independent operation of these same supply lines. The valve has a valve body having a central hollow bore extending through the valve body. Appropriate hot and cold water inlet and outlet nipples are attached to the valve body. A hot water control element fits within the hollow bore on one side of the valve with a cold water control element also fitting within the bore but on the opposite side of the valve. The control handle is located in the middle of the valve and is split, with one side connecting to the hot water control element and the other side connecting to the cold water control element. End caps are utilized to seal the end of the hollow bore so as to contain the control elements therein. The split control handle can be used as a unit to rotate both the control elements within the valve or one or the other of the split sides of the control handle can be operated independently to only rotate one of the control elements.

1 Claim, 5 Drawing Figures

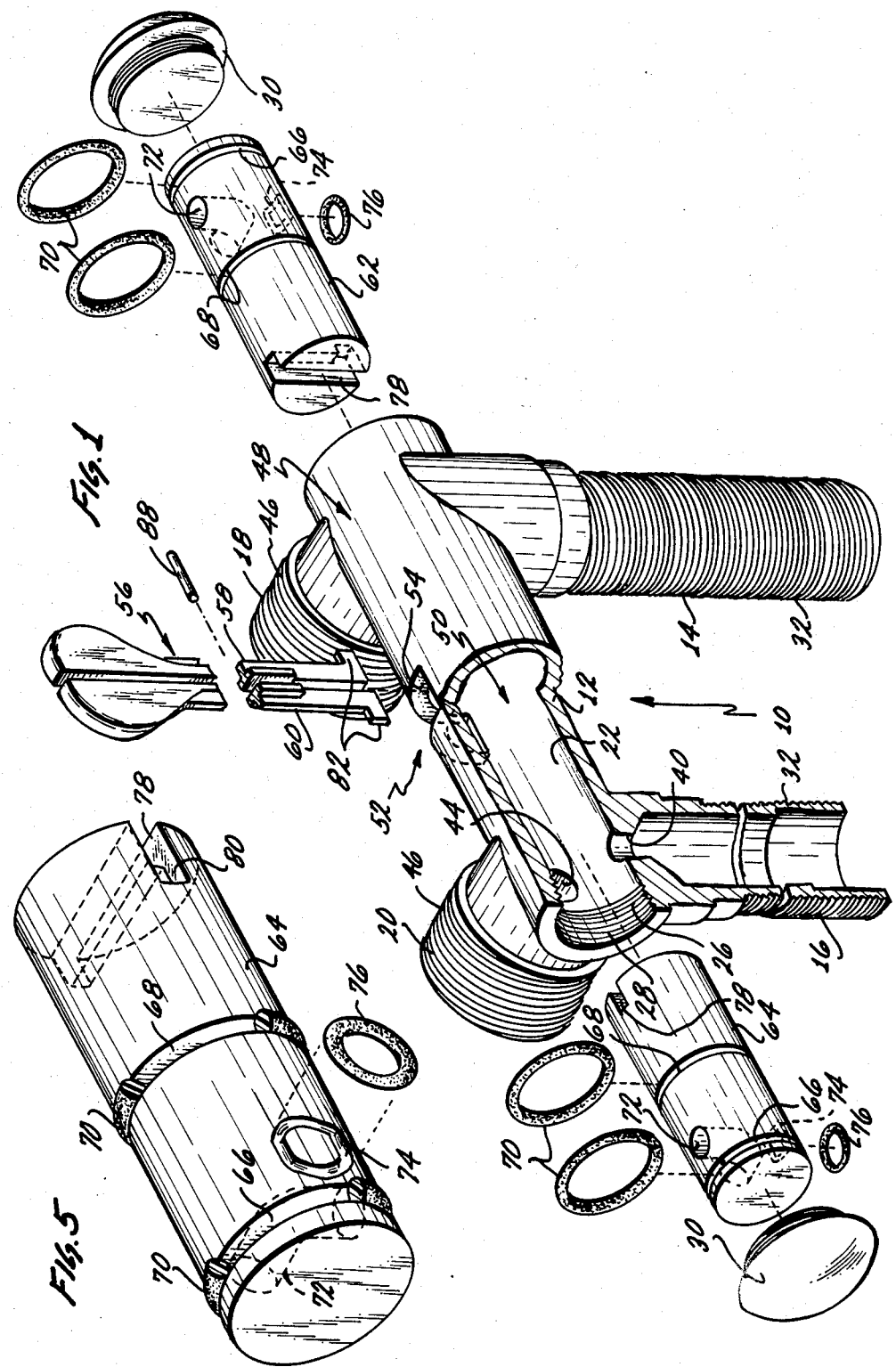

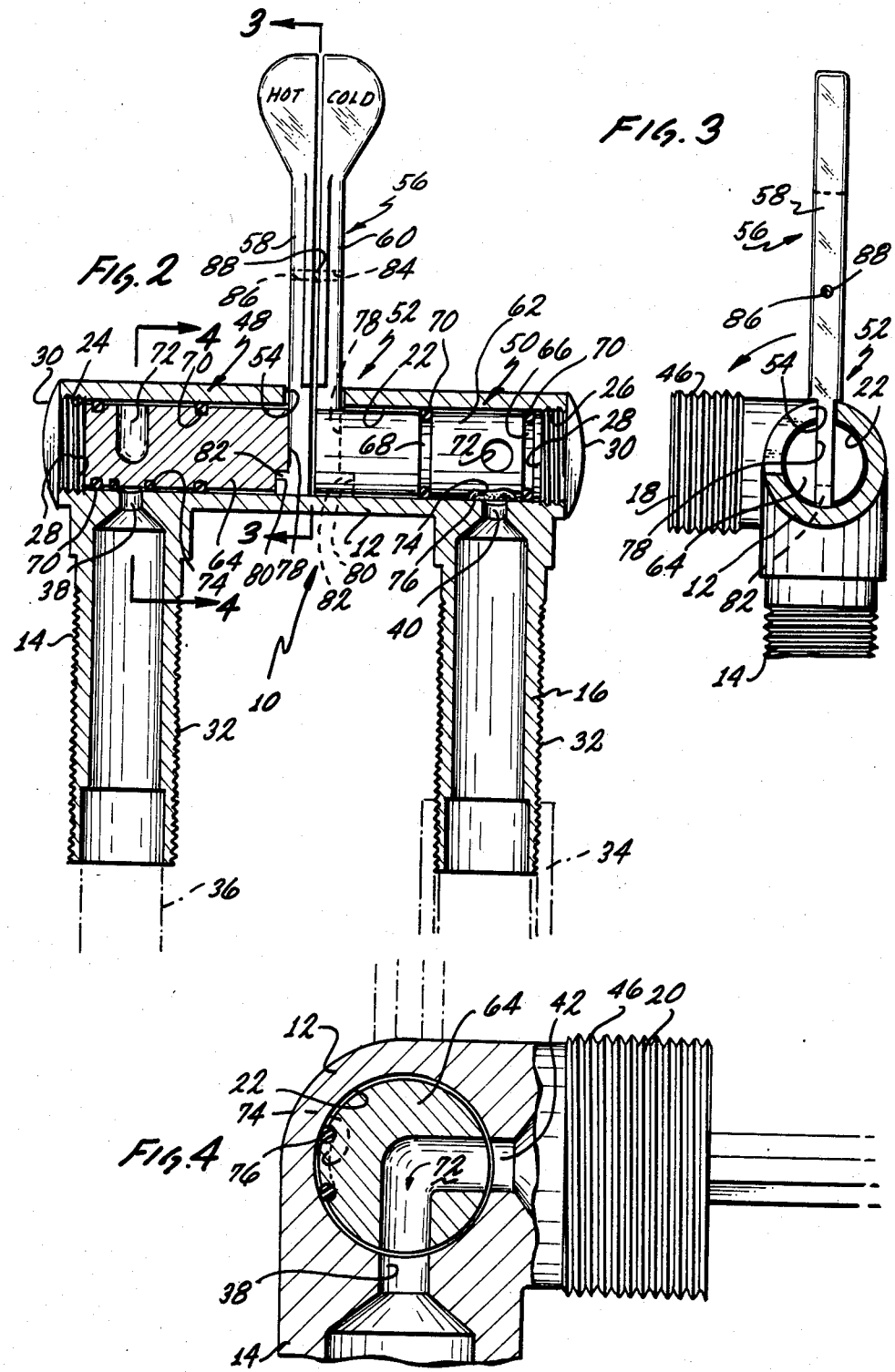

FLUID CONTROL VALVE

BACKGROUND OF THE INVENTION

This invention is directed to a fluid control valve, more particularly a water control valve, for use in association with appliances such as washing machines or the like. The valve includes a centralized control handle which can be utilized to simultaneously move both a first and second valve element between an on and off position or can be utilized to move only one of the valve elements independently of the other.

The manufacturers of certain appliances such as washing machines or the like which are connected to pressurized fluid systems almost universally recommend that the supply valve controlling the fluid flow to the appliance be shut down in the interval between uses of the appliance in order to isolate connecting hoses and other valve mechanisms within the appliance from the pressurized fluid supply. When applied to washing machines, this means that the operator of the washing machine should turn the hot and cold water taps off after each completion of use of the machine. This then requires that the operator also turn these valves back on when the machine is going to be used again.

While the practice described in the preceding paragraph in theory is a very good practice, as a practical matter, because of the inconvenience of turning a standard water supply valve off and on, it is a rare individual who follows the manufacturers recommendations in doing this. The valves attached to the hot and cold water supply in the typical home are the type requiring rotation of a knob in order to turn the valve off and on. Normally, the knob must be turned through several rotations in order to turn the valve off or on. Because of the inconvenience of turning these valves off and on, the user of the same generally neglects to do this, and the valve is normally left standing in an on position.

Most water supplies incorporate some sort of dissolved salts or the like. When a valve is left standing in an on position, the salts generally tend to precipitate in the valve, corroding the valve and making it even more difficult to operate the same. As it gets harder and harder to operate the valve, it is more and more likely that the valve will be left in an on position. Inevitably, the valve is simply left in this on position until a catastrophic event such as a hose bursting or the like occurs. At just such a time that it is absolutely necessary to turn the valve off, the valve is found frozen in an open position and an emergency call must be made to the local plumber.

In the last decade or so, the use of what is called a washing machine outlet box has become quite common. This is a small, water impervious housing which is placed in the wall, with the hot and cold water taps for the washing machine or other appliance located within the box. For aesthetic reasons, these boxes have slowly gotten smaller and smaller, with the most modern versions of these washing machine outlet boxes being only approximately six inches in size. This leaves little, if any, room for doing valve repair or the like within the box.

A prior valve exists which utilizes a single central lever to simultaneously turn off the hot and cold water systems attached to this valve. This valve certainly encourages the practice of turning these valves off or on each time the washing machine is used, because of the single lever used for simultaneously activating both of the valves. However, this valve is not designed to be used in conjunction with a washing machine outlet box in that the discharge nipples are located directly below and in line with the handle mechanism, requiring the totality of the valve to be positioned outwardly from a wall in order to attach or detach lines to the discharge nipples.

BRIEF DESCRIPTION OF THE INVENTION

In view of the above, it is evident that there exists a need for new and improved valve mechanism which can be utilized in conjunction with certain household appliances such as washing machines or the like. Therefore, it is a broad object of this invention to provide such valve mechanisms. Additionally, it is an object of this invention to provide a valve mechanism which utilizes a single lever which can be conveniently and rapidly moved with a minimum of physical effort to open and close the valve. Additionally, in the illustrative embodiment of this invention it is an object to provide for a valve which allows for simultaneously opening and closing of both a hot and cold water system, but still allows for independent operation of one or the other of the hot or cold water systems to the exclusion of the other. Further it is an object with regard to the illustrative embodiment of the invention shown herein to provide a valve which can be conveniently utilized in conjunction with a modern day washing machine outlet box.

These, and other objects as will become evident from the remainder of this specification are achieved in a valve which comprises: a valve body, said valve body having a first body portion, a second body portion and a central body portion, said central body portion located inbetween said first and second body portions; said valve body further including a continuous hollow bore passing through said first, said central and said second body portions; said valve body including a first water inlet means and a second water inlet means each opening into said hollow bore; said body further including a first water outlet means and a second water outlet means each opening into said hollow bore; said first water inlet means and said first water outlet means located on said first body portion in association with one another; said second water inlet means and said second water outlet means located on said second body portion in association with one another; a first valve element located in said hollow bore in said first body portion; a second valve element located in said hollow bore in said second body portion; said first valve element including a passageway located therein, said first valve element movable in said hollow bore between an on position and an off position, in said on position said passageway in said first valve element connecting between said first water inlet means and said first water outlet means, in said off position said first valve element sealing at least one of said first water inlet means and said first water outlet means against fluid flow; said second valve element including a passageway located therein, said second valve element movable in said hollow bore between an on position and an off position, in said on position said passageway in said second valve element connecting between said second water inlet means and said second water outlet means, in said off position said second valve element sealing at least one of said second water inlet means and said second water outlet means against fluid flow; said central body portion including an opening, a control lever associated with said valve body, a portion of said control lever passing through said opening in said central body portion such that a portion of said control lever is located outside of said valve body and a further portion of said control lever is located inside of said hollow bore within said valve body, said portion of said control lever located within said hollow bore operatively connected to each of said first and said second valve elements, said control lever movable within said opening on said valve body between an on position and a off position and in moving between said on and off positions said control lever moving said first and said second valve elements between their respective on and off positions.

BRIEF DESCRIPTION OF THE DRAWINGS

This invention will be better understood when taken in conjunction with the drawings wherein:

FIG. 1 is an exploded isometric view in partial section viewing an embodiment of the invention from back to front;

FIG. 2 is a front elevational view in section of the embodiment of FIG. 1;

FIG. 3 is a side elevational view in partial section taken about the line 3—3 of FIG. 2;

FIG. 4 is a side elevational view in partial section taken about the line 4—4 of FIG. 2 and showing certain of the components seen in FIG. 2 in a different spatial relationship than as shown in FIG. 2; and FIG. 5 is an isometric view showing an enlargement of one of the components seen in FIG. 1.

This invention utilizes certain principles and/or concepts as are set forth in the claims appended to this specification. Those skilled in the plumbing arts will realize that these principles and/or concepts are capable of being utilized in a variety of embodiments which may differ from the exact embodiment utilized for illustrative purposes herein. For this reason this invention is not to be construed as being limited solely to the illustrative embodiment, but should only be construed in view of the claims.

DETAILED DESCRIPTION OF THE INVENTION

The illustrative valve 10 shown in the Figs. is primarily designed to be utilized in conjunction with a washing machine outlet box for the control of hot and cold water supplied to a washing machine. However, it also is susceptible of being utilized in other situations wherein it is desirable to conveniently control fluid flow of both hot and cold water utilizing a centralized actuating mechanism.

The valve 10 has a body 12 preferredly formed as a single cast of an appropriate material, such as a metal or the like. Attaching to the body 12 is a first inlet nipple 14 and a second inlet nipple 16. Located at 90° to the inlet nipples 14 and 16 are first and second outlet nipples 18 and 20.

Extending crosswise through the body 12 of the valve 10 is a hollow bore 22. Hollow bore 22 has open ends 24 and 26 which each include an internal thread, collectively identified by the numeral 28. Two identical end caps, collectively identified by the numeral 30, thread into the threads 28 to seal the ends 24 and 26 of the hollow bore 22.

The inlet nipples 14 and 16 are elongated so as to extend downward allowing them to be inserted through appropriate openings in the bottom of the washing machine outlet box or the like and extend below the bottom of the box for coupling to appropriate supply pipes. The outside surfaces of the inlet nipples 14 and 16 include external threads collectively identified by the numeral 32, which allow for threading of appropriate pipes such as pipe 34 seen in FIG. 2 to these nipples. The threads 32, aside from allowing for connection of a pipe 34 also allow for attachment of the valve 10 a washing machine outlet box by threading appropriate nuts onto the threads 32 of the inlet nipples 14 and 16. Note that the threads 32 go almost up to the body 12 of the valve 10, allowing for securing of the valve 10 to an appropriate washing machine outlet box utilizing the threads 32 on the nipples 14 and 16.

The lower internal surface of the inlet nipples 14 and 16 are sized and shaped so as to allow insertion of an appropriate copper pipe or the like, such as pipe 36, as an alternate method of attaching the valve 10 to supply pipes. Thus, the valve 10 can be appropriately attached to copper pipe or the like utilizing the inside surface of the inlet nipples 14 and 16, or to appropriate galvanized pipe or the like utilizing the outside threaded surface of the inlet nipples 14 and 16. This allows utilization of the valve 10 with a variety of different pipes which might be required because of supply or local codes or the like.

The inlet nipples 14 and 16 lead to inlet orifices 38 and 40 which open into the hollow bore 22 of the body 12. Positioned at 90° to the inlet orifices 38 and 40 are outlet orifices 42 and 44. These serve to channel fluid from the interior of the hollow bore 32 to the outlet nipples 18 and 20 for delivery to an appropriate appliance. The outside surface of the outlet nipples 18 and 20 include external threads, collectively identified by the numeral 46, allowing for easy connection of supply hoses and the like leading from the valve 10 to an appropriate appliance such as a washing machine or the like. Because of the geometry of the valve 10, it is possible to locate the valve 10 within a washing machine outlet box with the inlet nipples 14 and 16 extending through the bottom of the box. The outlet nipples 18 and 20 are positioned to extend toward the front of the box, allowing for insertion of the appropriate connecting hoses or the like through the front of the box in a position such that they can be easily and conveniently threaded on to the outlet nipples 18 and 20.

The body 12 of the valve 10 can be essentially divided into a left hand section 48, a right hand section 50 and a central section 52. Located in the central section 52 is an opening 54 which extends from about the center top of the body 12 down across the front face to about midway through the front face. As such, the opening 54 extends approximately 90° around the circumferential shape of the body 12. Thus, the opening 54 extends 90° around the axis of the bore 22. A control handle 56 having right and left sides 58 and 60, respectively, is sized and shaped so as to fit through the opening 54 and move within the opening 54.

A cylindrical right valve element 62 and a cylindrically left valve element 64 each fit within the hollow bore 22 in the body 12. When the valve 10 is assembled, the right valve element 62 is essentially located in the right section 50 with the left valve element 64 located in the left section 48. Each of the valve elements 62 and 64 include an outboard groove collectively identified by the numeral 66 on the two valve elements, and an inboard groove, collectively identified by the numeral 68 on the two valve elements. Identical O rings, collectively identified by the numeral 70, are positioned in the inboard and outboard grooves 66 and 68 on each of the valve elements 62 and 64. The valve elements 62 and 64 are slightly undersized with respect to the diameter of the hollow bore 22 such that they can easily be rotated within the hollow bore 22. However, when the O rings 70 are appropriately located on the valve elements 62 and 64, the O rings 70 make a tight seal with the interior wall of the hollow bore 22 so as to isolate the area of the valve located between the inboard groove 66 and the outboard groove 68 from the remainder of the hollow bore 22.

Located in between the inboard and outboard grooves 66 and 68 on both of the valve elements 62 and 64 are right angle, elbow shaped passageways, collectively identified by the numeral 72. The passageways 72 serve as fluid channels between the inlet orifices 38 or 40 and the corresponding outlet orifices 42 or 44 when the appropriate valve element 62 or 64 is positioned with respect to the orifices such that the ends of the passageways 72 are located adjacent to the appropriate orifice.

When the valve element 64 as seen in FIG. 4 is positioned as seen in FIG. 4, a fluid passageway is completed from the orifice 38 through the passageway 72 to the orifice 42. This allows for fluid flow from the inlet nipple 14 to the outlet nipple 20. If the valve element 64 is rotated, the openings of the passageway 72 in the circumferential extending surface of the valve element are 64 no longer aligned with the orifices 38 and 42 and thus sever the pathway from the orifice 38 to the orifice 42.

The valve elements 62 and 64 are cylindrical in shape as can be seen in the Figs. and as noted above, are slightly undersized with respect to the internal diameter of the hollow bore 22. A small depression collectively identified by the numeral 74 is formed in each of the valve elements 62 and 64. The depression 74 is positioned opposite the exit opening of the passageway 72. That is, it is 180° from the exit opening of the passageway 72 and approximately 90° from the inlet opening of the passageway 72. If, in FIG. 4, the valve element 64 is rotated clockwise 90° this positions the depression 74 directly over the inlet orifice 38. A small O ring, collectively identified by the numeral 76, is located in each of the depressions 74. When the depressions 74 are located over the outlet orifices 42 or 44 respectively for the two valve elements 62 and 64, the O ring 76 seals the orifices 38 and 40. This is as is shown in FIG. 2. This effectively prevents fluid flow through the inlet orifices 38 and 40 between the walls of the cylindrical elements 62 and 64 and the interior of the hollow bore 22. As such, the orifices 38 and 40 are sealed when the valve elements 62 and 64 are rotated so as to orient their appropriate depressions 74 and the O ring 76 directly over these orifices.

Each of the valve elements 62 and 64 also include a slot, collectively identified by the numeral 78, located in their interior end. The slot 78 includes a small dog leg 80 which is positioned axially in line with the depression 74 which, for identification purposes could be considered along the bottom of the cylindrical surface of the elements 62 and 64. The slots 78 and their dog legs 80 serve to connect the elements 62 and 64 to the control handle 56.

Each of the right side section 58 and left side section 60 of the control handle 56 includes a small dog 82 formed on its lowermost surface. The dogs 82 fit within the dog leg 80 when the lower end of the sections 58 and 60 of the control handle 56 are appropriately located within the slots 78 of the valve elements 62 and 64. This connects the valve elements 62 and 64 to the right and left sections 58 and 60, respectively, of the control handle 56. Movement of the control handle 56 within the opening 54 is then communicated to the elements 62 and 64 to rotate them within the hollow bore 22 of the valve body 12.

The valve is assembled as follows. If assembly is being conducted outside of a washing machine outlet box or the like, wherein there is sufficient room to manipulate the valve at whim or will, the two sections 58 and 60 of the control handle 56 are inserted through the opening 54 and held there. One at a time, the valve elements 62 and 64 are inserted through the appropriate openings 26 and 24 of the body 12 until the elements 62 and 64 abutt against the control handle 56 such that the right and left sections 58 and 60 of the control handle 56 fit within the slot 78 and the dogs 82 are positioned in the dog legs 80. The caps 30 are then attached to the valve body 12 and assembly of the valve is complete.

It is not necessary to use both of the end caps 30 to assemble or disassemble the valve 10. Assembly and disassembly can be done from one end. This will be described for disassembly of the valve 10. One of the end caps 30 is removed, as for instance, the cap 30 on the left hand side of FIG. 2. The left valve element 64 is then extracted from the body 12 and then the left section 60 of the control handle 56 lifted up. Next the right section 58 of the control handle 56 is lifted up and out of the opening 54, allowing for extraction of the right valve element 62 from the left hand end of the hollow bore 22. The cap on the right hand side of the body 12 need not be removed. This ease of assembly and disassembly from only one end can be important if, for instance, the valve 10 is located in a washing machine outlet box with, as for instance, the cap on the right hand side abutted directly against the right hand wall of the washing machine outlet box. In any event, both of the valve elements 62 and 64 can be removed or inserted either through one or the other of the open ends of the hollow bore 22 in the body 12.

The control handle 56 includes a drilling 84 in the right hand section 58 and a second drilling 86 in the left hand section 60, which are aligned with one another. A small pin 88 can be inserted through both of these drillings to connect the two sections 58 and 60 of the control handle 56 together, such that they operate as a unit. This allows for turning off and on both the left and right hand sides of the valve 10 simultaneously with one movement of the handle 56, a downward movement to turn the valves on, and an upward movement to close the same. If it is desired to independently operate the left and right hand sections of the valve 10, pin 88 can be extracted and the right and left hand sections of the control handle 56 can be operated independently of each other. Since the right hand section of the control handle 56 only connects to the right side valve element 62, only that element will be rotated if the right hand section 58 of the control handle 56 is operated, and likewise for the left hand section 60.

While the caps 30 seal the ends of the hollow bore 22, no fluid pressure is applied to the caps 30 because of the O ring 70 located in the outboard groove 66. In a similar manner, the O ring 70 located in the inboard groove 68 on both of the right and left valve elements 62 and 64 prevent fluid seepage toward the central section 52 and out of the opening 54 in this section. Because of the ease in using the valve 10, the owner of an appliance such as a washing machine or the like is more apt to follow the manufacturer's recommendation to isolate these appliances from water pressure or the like when they are not in use. This leads to longevity of the hoses connecting the appliances to the valve 10 as well as internal valves or the like located within the appliances.

I claim:

1. A valve for use in either separately or concurrently controlling hot and cold water flow to a washing machine which comprises:

a unitary valve body shaped so as to include an internal, elongated, cylindrical hollow valve bore having internally threaded ends open to the exterior of said valve body, said valve body also including a first inlet nipple and a first outlet located at an angle of 90° with respect to one another around the axis of said bore adjacent to a first one of said ends of said bore and also including a second inlet nipple and a second outlet located at an angle of 90° with respect to one another aound the axis of said bore adjacent to the other of said ends of said bore, both of said inlets and both of said outlets having internal orifices intersecting said bore, said valve body also including an opening leading into said bore and located medially of the ends of said valve and extending across 90° around the axis of said bore, a cylindrical valve element located at each of said ends of said bore, each of said valve elements fitting closely within said bore so as to be capable of being rotated therein and having a right angle passageway which is capable of being positioned so as to place one of said inlet nipples in communication with its associated outlet and which is capable of being located so as to block flow between such inlet and said outlet, each of said valve elements also including a depression capable of being positioned so as to extend around the inlet orifice adjacent to such valve element and circumferential grooves located at each side of such depression, a sealing member located within the depression of each of said valve elements and within each of said circumferential grooves, said sealing members extending from said valve elements so as to form a seal with the interior of said bore, said valve elements also having adjacent ends with dog-legged shaped slots located therein, said adjacent ends of said valve elements being located adjacent to said opening in said valve body, a split handle extending from the exterior of said body into the interior of said body through said opening, said split handle having first and second separate sides, a portion of each of said sides being shaped so as to fit within the slot in one of said valve elements in such a manner so that said sides cannot be withdrawn from such member when the valve is assembled, said sides of said split handle being separately movable with respect to one another and being located closely enough adjacent one another so as to be capble of being moved as a unit, and end caps threaded within each of said ends of said bore, said end caps serving to maintain said valve elements within said bore with the adjacent ends of said valve elements closely enough adjacent to one another so as to retain said sides of said split handle in said slots.

* * * * *